United States Patent
Jalal et al.

(10) Patent No.: US 10,452,593 B1
(45) Date of Patent: Oct. 22, 2019

(54) HIGH-PERFORMANCE STREAMING OF ORDERED WRITE STASHES TO ENABLE OPTIMIZED DATA SHARING BETWEEN I/O MASTERS AND CPUS

(71) Applicant: Arm Limited, Cambridge (GB)

(72) Inventors: Jamshed Jalal, Austin, TX (US); Tushar P. Ringe, Austin, TX (US); Ashok Kumar Tummala, Cedar Park, TX (US); Gurunath Ramagiri, Austin, TX (US)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 16/027,490

(22) Filed: Jul. 5, 2018

Related U.S. Application Data (60) Provisional application No. 62/666,246, filed on May 3, 2018.

(51) Int. Cl.
*G06F 13/42* (2006.01)
*G06F 12/0831* (2016.01)
*G06F 15/173* (2006.01)

(52) U.S. Cl.
CPC ...... *G06F 13/4217* (2013.01); *G06F 12/0831* (2013.01); *G06F 15/1735* (2013.01)

(58) Field of Classification Search
None
See application file for complete search history.

(56) References Cited

U.S. PATENT DOCUMENTS

| | | | | |
|---|---|---|---|---|
| 2004/0177197 A1* | 9/2004 | McLeod | ............ | G06F 13/4045 710/300 |
| 2007/0245059 A1* | 10/2007 | Tjia | ............ | G06F 13/4027 710/313 |
| 2013/0042077 A1* | 2/2013 | Mannava | ............ | G06F 12/0831 711/146 |
| 2013/0132625 A1* | 5/2013 | Hall | ............ | G06F 13/4295 710/106 |
| 2014/0215108 A1* | 7/2014 | Pandit | ............ | G06F 13/4282 710/105 |

\* cited by examiner

*Primary Examiner* — Ilwoo Park
(74) *Attorney, Agent, or Firm* — Leveque IP Law, P.C.

(57) ABSTRACT

A data processing network and method of operation thereof are provided for efficient transfer of ordered data from a Request Node to a target node. The Request Node send write requests to a Home Node and the Home Node responds to a first write request when resources have been allocated the Home Node. The Request Node then sends the data to the written. The Home Node also responds with a completion message when a coherency action has been performed at the Home Node. The Request Node acknowledges receipt of the completion message with a completion acknowledgement message that is not sent until completion messages have been received for all write requests older than the first write request for the ordered data, thereby maintaining data order. Following receipt of the completion acknowledgement for the first write request, the Home Node sends the data to be written to the target node.

25 Claims, 7 Drawing Sheets

HIGH-PERFORMANCE STREAMING OF ORDERED WRITE STASHES TO ENABLE OPTIMIZED DATA SHARING BETWEEN I/O MASTERS AND CPUS

RELATED APPLICATION

This application claims the benefit of provisional application Ser. No. 62/666,246 filed May 3, 2018 and titled 'HIGH-PERFORMANCE STREAMING OF ORDERED WRITE STASHES TO ENABLE OPTIMIZED DATA SHARING BETWEEN I/O MASTERS AND CPUs', the entire contents of which are hereby incorporated herein.

BACKGROUND

In a data processing system, data may be received or transmitted via an input/output (I/O) interface. This may be an I/O controller interface to an off-chip data resource or a network interface controller (NIC) to a resource of a local or remote network.

When data is received from an I/O interface it is directed to a storage resource of the data processing system, such as a memory or cache. Cache Stashing is a mechanism to install data within a particular cache in a data processing system. Cache stashing ensures that data is located close to its point of use, thereby improving the system performance.

An example of an I/O interface is a standard Peripheral Component Interconnect Express (PCIe) serial bus interface. PCIe based systems make use of transaction layer packet (TLP) Processing Hints (TPH) to add steering tags on PCI write messages which can be used to identify a stash target for write data. This mechanism introduces strongly ordered write stashes (required by posted writes ordering rules of the PCIe standard) which need to be handled by a system interconnect. However, interconnects, such as a coherent mesh network, are typically un-ordered, since data may take any of a number of different routes through the interconnect. In addition, current data processing interconnects are either unable to stash strongly ordered write data into CPUs or they are not capable of doing it at sufficiently high performance (Generation 4 of the PCIe standard supports write bandwidths of up to 32 GBps, for example). Still further, current systems are unable to stash strongly ordered write data from independent PCIe masters at high performance without issues such as deadlocks.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

The various apparatus and devices described herein provide mechanisms for automatic routing and allocation of incoming data in a data processing system.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the embodiments described herein.

The present disclosure relates to a mechanism in a data processing system that enables high-performance streaming of ordered write stashes in an un-ordered interconnect. The mechanism enables optimized data sharing between multiple I/O devices and processing devices while providing high bandwidth.

The disclosure will be described with reference to a multi-core architecture with a cache coherent interconnect (CCI), such as a coherent mesh network (CMN), that connects a set of processing core clusters, a set of home nodes (HN) including a system level cache (SLC) shared across all cores, a set of memory controllers and I/O device interfaces.

Figure 1:
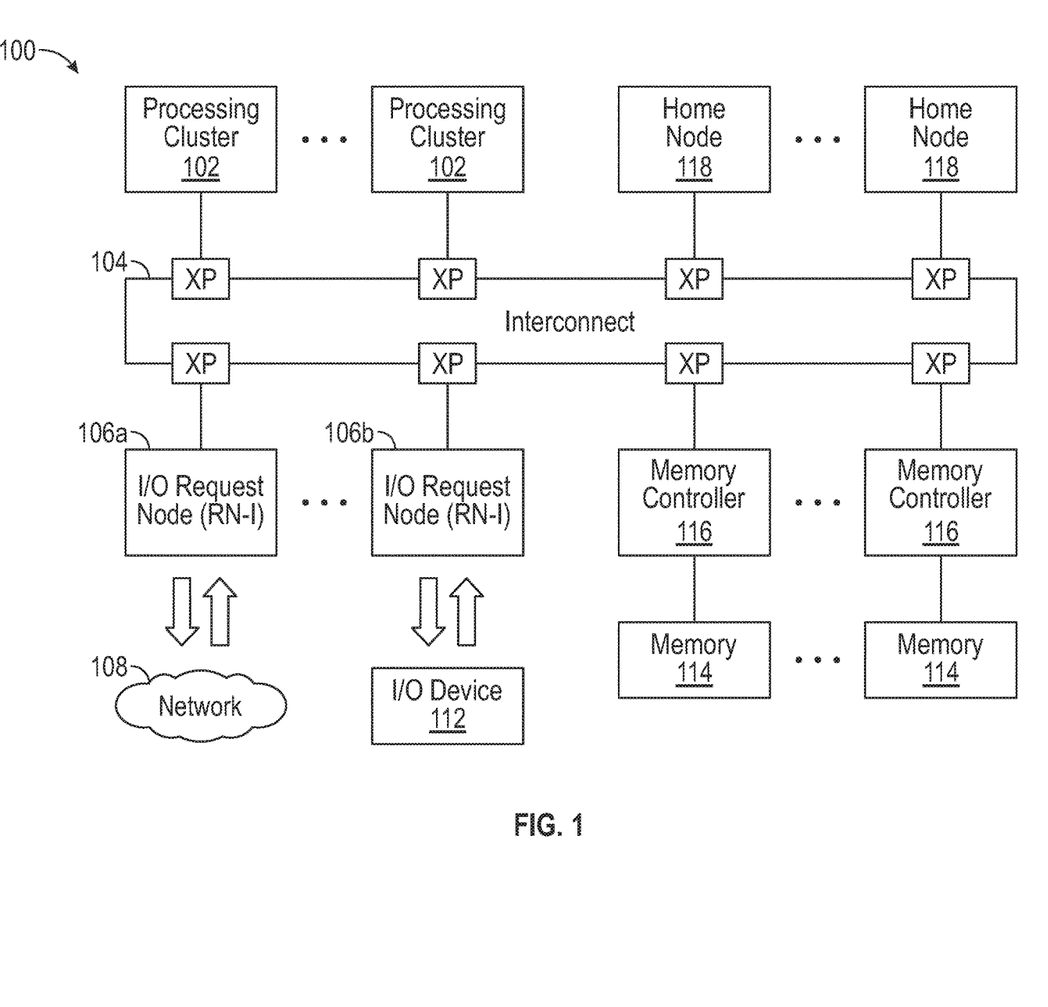
FIG. 1 is a block diagram of a data processing system, in accordance with various representative embodiments.

FIG. 1 is a block diagram of a data processing system 100, in accordance with various representative embodiments. A number of processing core clusters 102 (referred to as request nodes) are coupled to data resources via coherent interconnect 104. Data is received via input/output (I/O) requesting nodes (RN-I). In the example shown, RN-I 106*a* comprises a network interface controller (NCI) that receives data from network 108 and RN-I 106*b* receives data from I/O device 112. I/O device 112 may be coupled via a peripheral component interconnect express (PCIe) bus, for example. Data may be stored in one or more memory or storage devices 114 that are coupled to interconnect 104 via memory controllers 116. Home nodes (HN) 118 include system level caches. Each home node (HN) serves as a point of coherence for data stored at a given set of system addresses. Data received from I/O requesting nodes 106*a* and 106*b* may be routed to a home node. The home node then stores the data in a system level cache of the HN or sends it to a memory controller 116 for storing in a memory 114. Alternatively, using a process referred to as 'cache stashing', data received at I/O requesting nodes 106*a* and 106*b* may be routed to a cache of a target device such as processing cluster 102. Cache stashing is a mechanism through which an I/O interface can write data to a core's private caches (L1, L2) or to a cluster cache (L3) of a processing cluster 102. The present disclosure relates to cache stashing mechanism for transporting ordered data from an I/O device 112 to a cache of a target device such as a processing cluster 102.

Figure 2:
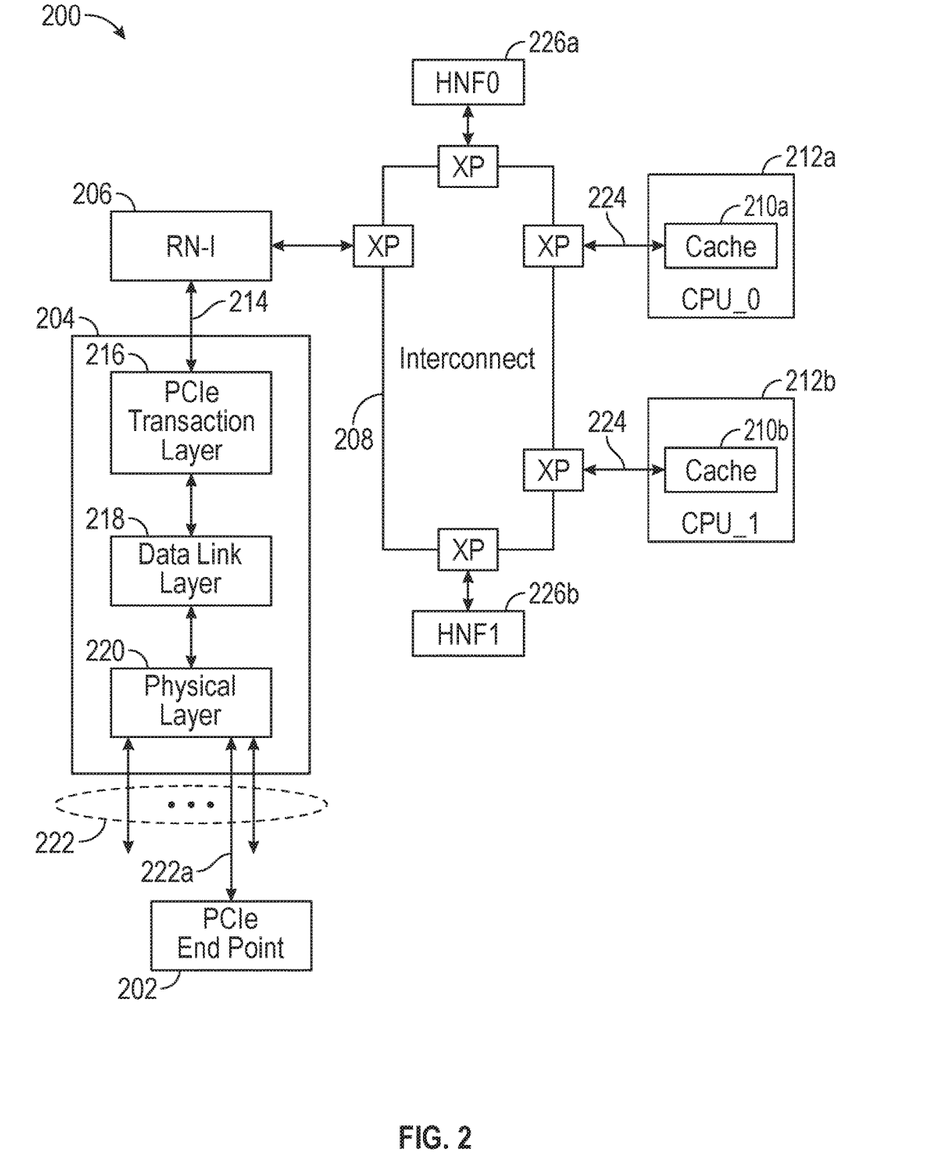
FIG. 2 is a block diagram of processing cluster, in accordance with various representative embodiments.

FIG. 2 is a block diagram of a data processing system 200, in accordance with embodiments of the disclosure. In this example, the I/O device is a PCIe end-point 202 that is coupled via PCIe root complex 204, I/O requesting node (RN-I) 206, and interconnect 208 to caches 210*a* and 210*b* of processing clusters (request nodes) 212*a* and 212*b*, respectively. In operation, PCIe root complex 204 injects ordered write stashes into interconnect 208 on interface 214 (such as an Arm® AMBA® Advanced eXtensible Interface (AXI) of Arm Limited). The ordered writes may be tagged with an identifier, such as a stream identifier, to indicate that they belong to a common group and should be routed on the same channel.

In current data processing systems, writes belonging to the same group are serialized by I/O Requesting Node 206 and dispatched, one at a time to the interconnect. This results in sub-optimal performance for ordered writes.

PCIe root complex 204 may implement a layered protocol comprising transaction layer 216 data link layer 218 and physical layer 220. Physical layer 220 may provide 16 lanes 222 for connection with PCIe end-points. In the example shown, lane 222*a* is coupled to end-point 202.

Request nodes 212*a* and 212*b* may be coupled to the interconnect 208 via interface 224, which may be an Arm® AMBA® coherent hub interface (CHI) of Arm Limited, for example.

Home nodes 226*a* and 226*b* provide points of coherence for group system addresses.

In accordance with certain aspects of the disclosure, a data processing network and method of operation thereof are provided for efficient transfer of ordered data from a Request Node (RN-I) to a target node. The RN-I sends write requests to a Home Node (HN) and the HN responds to a first write request when resources have been allocated by the HN. The RN-I then sends the data to be written. The HN also responds with a completion (COMP) message when a coherency action has been performed at the HN. The RN-I acknowledges receipt of the COMP message with a COMP_ACK message. This message is not sent until COMP messages have been received for all write requests that are older than the first write request for the ordered data, thereby maintaining data order. Following receipt of the COMP_ACK for the first write request, the HN sends the data to be written to the target node.

FIGS. 3-7 show transaction flow diagrams for various transactions, consistent with embodiments of the disclosure. The embodiments below are described with reference to an Arm® AXI (Advanced eXtensible Interface) with a PCIe master device. However, other interfaces may be used without departing from the present disclosure. In the figures, the following message notations are used.

Figure 3:
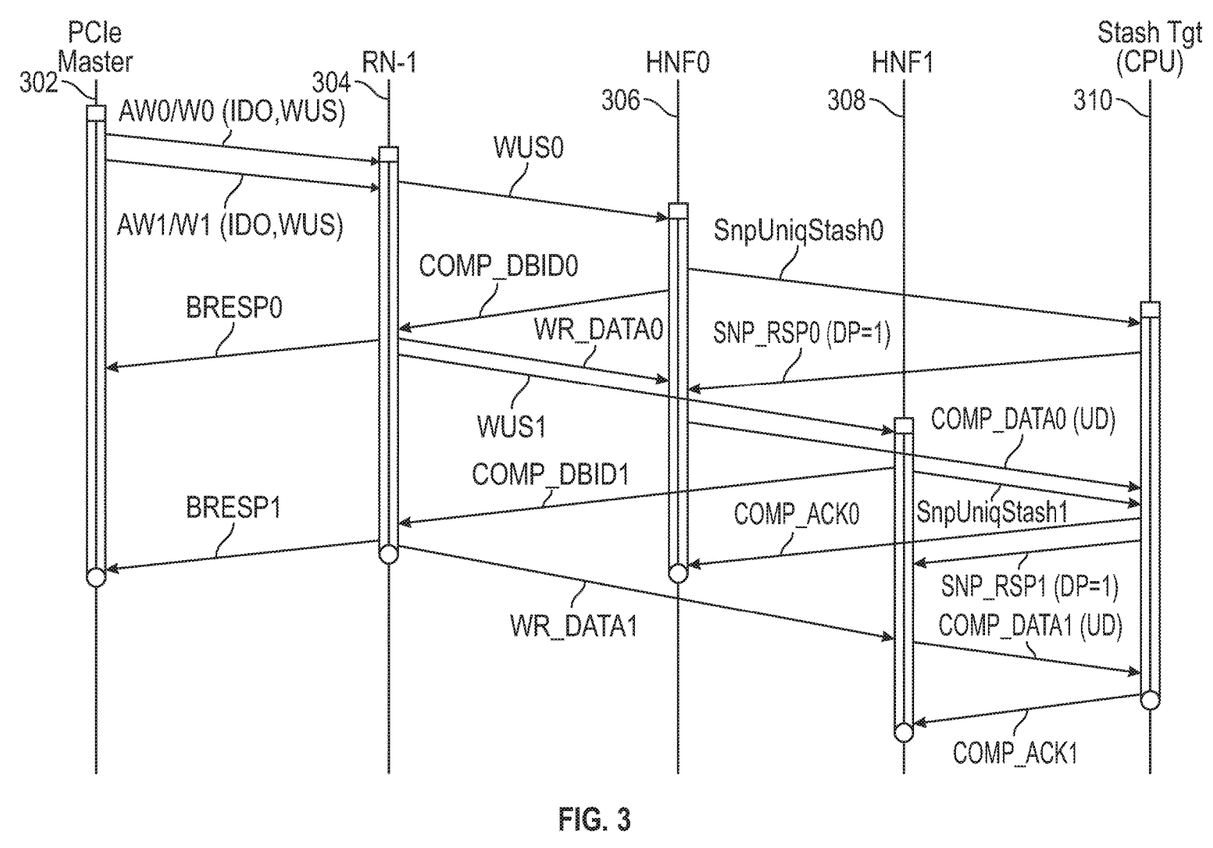
FIG. 3 is a transaction flow diagram for conventional data stashing.

For communication with the I/O master:
AW: Write Address/Control channel on AXI
W: Write Data channel on AXI
BRESP: Write Completion on AXI
and for communication between nodes:
WR_UNIQ_STASH (WUS): Write Unique Stash request
RD_NO_SNP: Read, no Snoop request
WR_NO_SNP: Write, no Snoop request
WriteUniqPtl: Write Unique partial request
DBID_RSP: Write Data Buffer credit message
COMP: Completion message
COMP_DBID_RSP: Combined Data Buffer credit and completion message
WR_DATA: Write Data message
SnpUniqStash: Snoop Unique Stash message
SNP_RSP: Snoop response
COMP_ACK: Completion acknowledgment
Retry_Ack: Retry acknowledgement response
CRD_GNT: Credit Grant message FIG. 3 is transaction flow diagram for a current data processing system. In FIG. 3, the vertical lines are timelines, with time flowing downwards and the arrow denote message/data transfers between devices. The following timelines are shown: 302 for a source device (a PCIe master in the example shown), 304 for I/O request node (RN-1), 306 for a first home node (HNF0), 308 for a second home node (HNF1) and 310 for the stash target or target device. Stash requests, e.g. AW0/W0 (ID0,WUS), are sent from the PCIe master to the I/O request node (RN-1). The RN-I uses a system address map to determine which home node (HNF0 or HNF1 in this example) should handle the data and pass it to the stash target. In the current system, ordered write stash message (such as WR_UNIQ_STASH messages WUS0 and WUS1) are serialized at RN-I resulting in a low bandwidth for writes. This low bandwidth behavior may not be acceptable for some applications and may not be sufficient to comply with standards such as PCIe Generation 4. For example, referring to FIG. 3, two write requests, AW0/W0 and AW1/W1, sent from the PCIe master are received at the I/O request node (RN-I), but processing of the second write request by the RN-I (which begins when WUS1 is sent to HNF1) waits until after the first data has been sent to HNF0 in message WR_DATA0. Thus, current systems (i.e. current interconnects) do not stash strongly ordered writes (such as from PCIe masters) into CPUs at sufficiently high performance levels.

Mechanisms disclosed herein enable a set of I/O Masters (such as a PCIe Root Complex) to stash strongly ordered write data into a CPU cache at high bandwidth. The mechanisms provide enhancements to the interconnect (which may be a coherent mesh network, for example), the transfer protocol, the I/O requesting nodes (RN-Is), and the home nodes (HNs) of the system.

In one embodiment, the protocol for interfacing a node with the interconnect (such as a Coherent Hub Interface (CHI) protocol) is enhanced for WR_UNIQ_STASH requests to add an optional COMP_ACK packet response and to add a WR_DATA_CANCEL data operation. Here, WR_UNIQ_STASH is a request to stash data to a cache of a CPU (the stash target) and to tag the data as having the coherence state UNIQUE.

An I/O Requesting Node (RN-I) is enhanced for WR_UNIQ_STASH requests to add streaming flow with RequestOrder and ExpCompAck messages or attributes and to add a WR_DATA_CANCEL message for use when the RN-I detects deadlock resulting from resource conflict in interconnect because of streaming flow.

A Home Node (HN-F) is enhanced to add dual COMP_ACK flow and further enhanced to delay sending Stash Data to the stash target, such that Stash Data is dependent on receiving COMP_ACK. This ensures that Stash Data in CPU is not observed till all previous ordered writes are observed.

Figure 4:
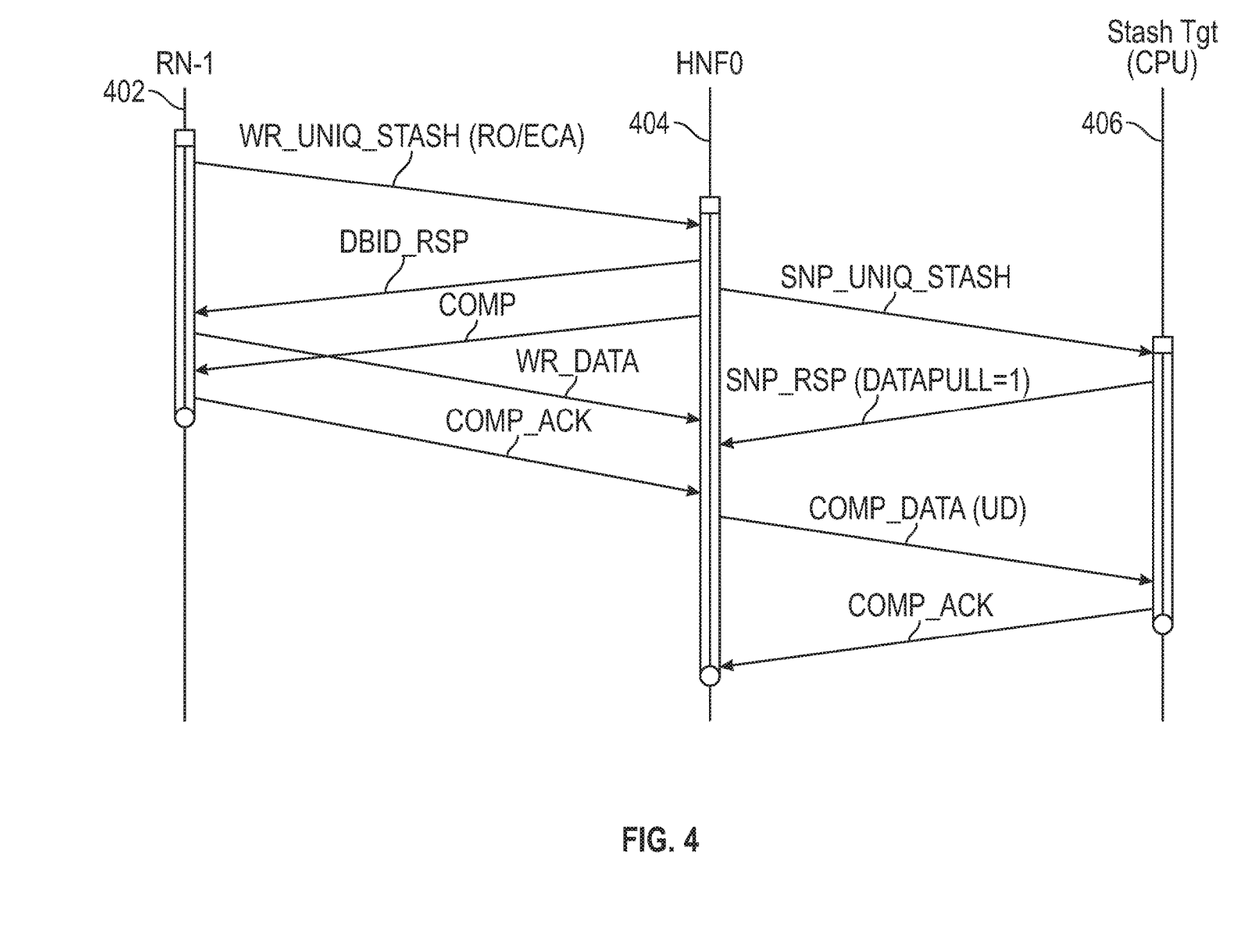
FIGS. 4-7 are transaction flow diagrams for data stashing, in accordance with various representative embodiments.

FIG. 4 is a transaction flow diagram for a data processing system, in accordance with embodiments of the disclosure. FIG. 4 shows timeline 402 for an RN-I, timeline 404 for HN (HNF0) and timeline 406 for a target node, such as a CPU. Data may be transferred from the RN-I to a cache of the target node, rather than transferred to a shared memory. This process is referred to as 'stashing' and the target node is also referred to as the stash target.

FIG. 4 shows an embodiment of a method for transferring data from an source device, such as PCIe master, acceleration unit, or graphics processing unit, via the RN-I and HN, to a target device in a data processing network. The source device is coupled to the RN-I and sends ordered data to the RN-I. The ordered data is associated with a stream identifier that identifies the particular data stream. The RN-I sends a write request (WR_UNIQ_STASH) to the HN, where the write request comprises an indicator of the target device, a request order (RO) message indicating to the HN that the RN-I will send multiple write requests without any dependency, and an expect completion acknowledgement (ExpCompAck or ECA) message indicating to the HN that observation order is to be controlled by the release of a completion acknowledgement (COMP_ACK) message from the RN-I.

The HN allocates resources, such as a data buffer for the write transaction, and sends a data buffer identifier (DBID_RSP) message to the RN-I, identifying a data buffer for receiving the data to be written, and a completion (COMP) message indicating completion by the HN. The RN-I, in response to the DBID-RSP message, sends the data to be written as the WR DATA message. The RN-I, in response to the COMP message, sends a first completion acknowledgement (COMP_ACK) message to the HN. The transaction by the RN-I is then complete. The HN, in response to the first COMP_ACK message, sends the data to be written to the target device in the COMP_DATA(UD) message. The 'UD' designation indicates that the coherence state of the data is unique and dirty, meaning that only one node has a copy of the data and the data does no match that stored in the shared memory for the address. In response, the target device sends a second COMP_ACK message to the HN.

An important feature of this approach is that the first COMP_ACK message is not sent by the RN-I until COMP messages for all write requests older than the first write request and having the same stream identifier as the first write request have been received by the RN-I. This ensures proper ordering of the data.

As part of the data coherency protocol the HN sends a snoop message (SNP_UNIQ_STASH) to the target device. The target device responds with a SNP RSP (DATA-PULL=1) message.

Referring to FIG. 4, it is noted that RN-I generates WR_UNIQ_STASH request with RequestOrder=1 (RO=1) and ExpCompAck=1 (ECA=1). The Request Order (RO) message indicates to the home node that the RN-I will send multiple WR_UNIQ_STASH requests without any dependency. The ExpCompAck (ECA) message indicates that observation order is controlled by the release of the COMP_ACK message from the RN-I. It is further noted that the home node HN-F creates a novel dual-COMP_ACK flow, where the WR_UNIQ_STASH transaction from the RN-I is interlocked with the SNP_UNIQ_STASH transaction to the CPU cache target, thereby needing to manage two COMP_ACK in the same transaction—one from the RN-I and one from the stash target (CPU). In contrast, the transaction in FIG. 3 uses a single COMP_ACK for each write. Still further, it is noted that HN-F do not expose the stash data to the target node (CPU) (via the message COMP_DATA (UD)) until the corresponding COMP_ACK message is received from RN-I. This ensures that stash data is observed in the correct order.

Figure 5:
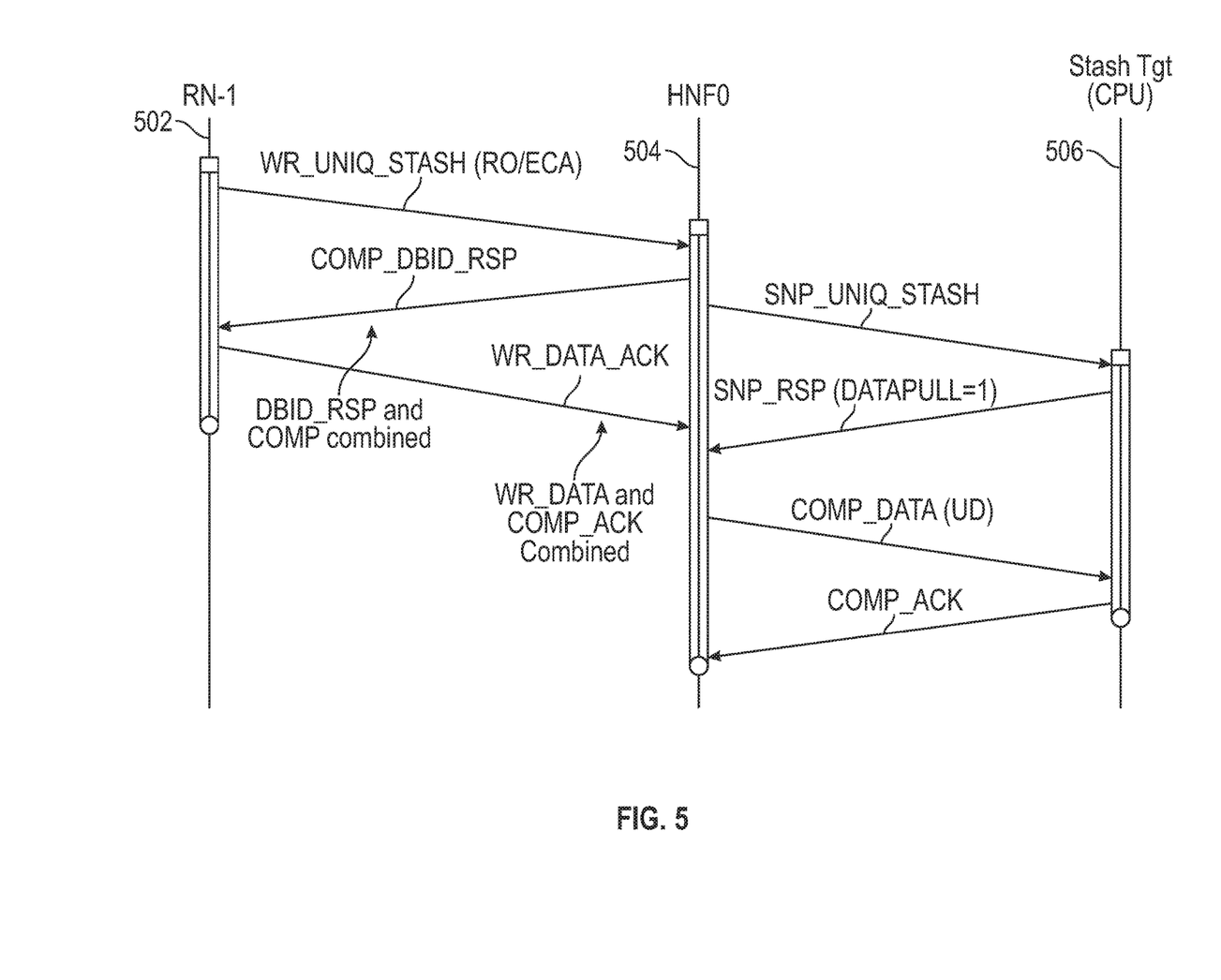

FIG. 5 is a further transaction flow diagram for a data processing system, in accordance with embodiments of the disclosure. FIG. 5 shows timeline 502 for an RN-I, timeline 504 for HN (HNF0) and timeline 506 for a target node, such as a CPU. FIG. 5 illustrates how the flow can be optimized by combining DBID_RSP and COMP together in a single message at home node HN-F, while requesting node RN-I can combine WR DATA with COMP_ACK in a single message. Home node HN-F uses combined flow when it determines, during snoop filter look up, that no CPUs have the old copies of the data. Similarly, requesting node RN-I uses combined flow when it determines, while sending WR_DATA, that all the older writes have received COMP so it can use the WR_DATA_ACK opcode, which combines WR_DATA with COMP_ACK.

Figure 6:
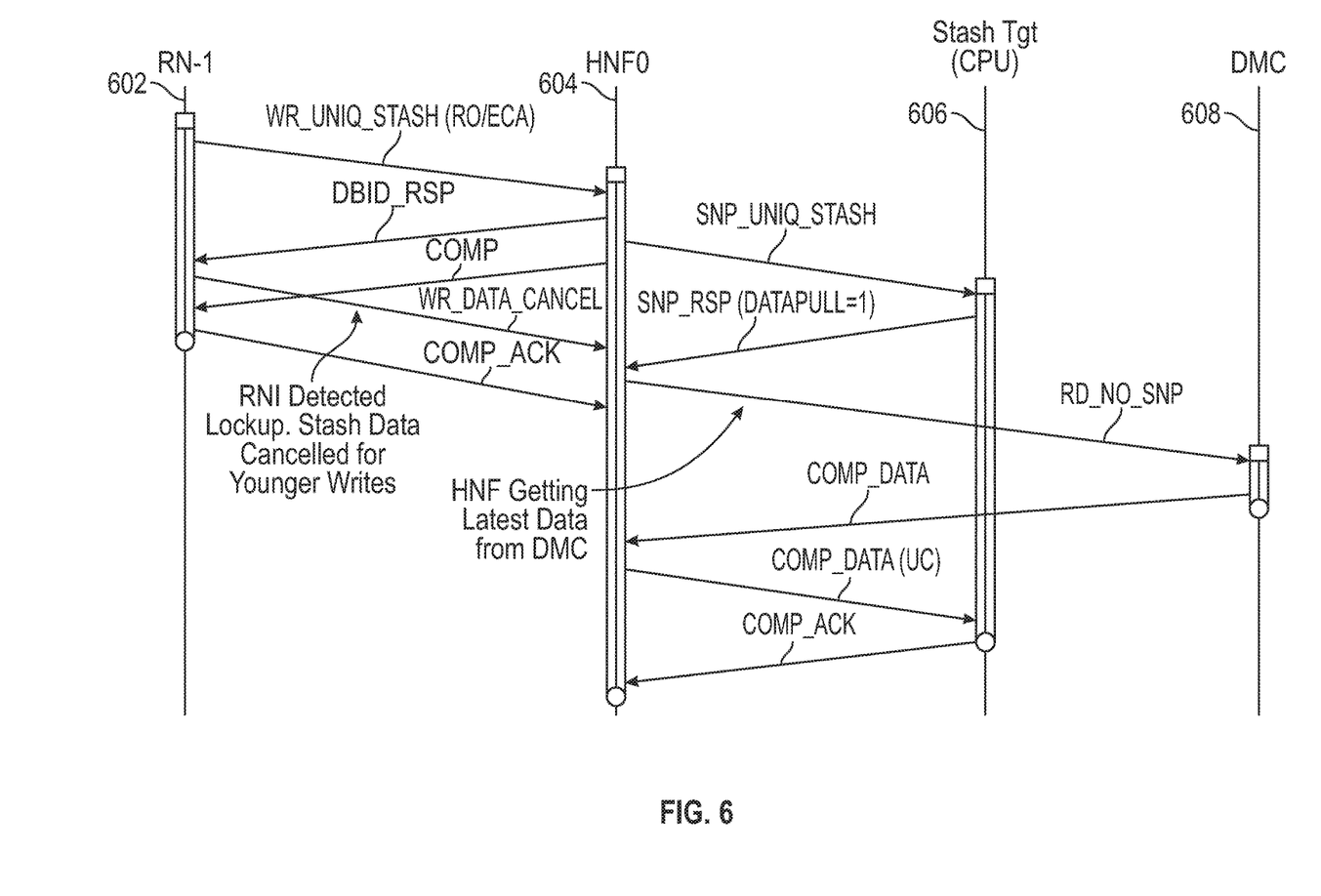

FIG. 6 is a further transaction flow diagram for a data processing system, in accordance with embodiments of the disclosure. FIG. 6 shows timeline 602 for RN-I, timeline 604 for HN (HNF0), timeline 606 for a target node, such as a CPU, and timeline 608 for a memory controller (DMC). FIG. 6 illustrates use of the WR_DATA_CANCEL message. In the case of multiple masters issuing strongly ordered writes into the system, it is possible for writes to become deadlocked because of cyclic dependencies introduced in the system. To alleviate the deadlock, the WR_DATA_CANCEL flow is used in conjunction with a WR_UNIQ_STASH request as shown. In the case of a cancelled stash transaction, the home node HN-F stashes a current data value in the system cache. Requesting node RN-I can later replay the actual stash transaction, which will then be stashed into the designated CPU cache. Thus, the RN-I detects deadlock resulting from resource conflict in an interconnect and sends a message to cancel the first write request to the HN. In response, the HN send a snoop request (RD_NO_SNP) to a memory controller to retrieve a latest copy of the data associated with an address of the data to be written. The memory controller sends back the latest copy of the data associated with the address of the data to be written in message COMP_DATA. This date is then sent, in message COMP_DATA (UC) to the target device instead of the data to be written. The coherence state of the data at the target device is unique-clean (UC), since the data matches that stored in the memory accessed by the memory controller. As before, the target device acknowledges receipt of the data with a COMP_ACK message. Upon receipt of this second OCMP_ACK message (the first being from the RN-I), the transaction is complete at the HN and the allocated resources (such as the data buffer) may be freed.

Figure 7:
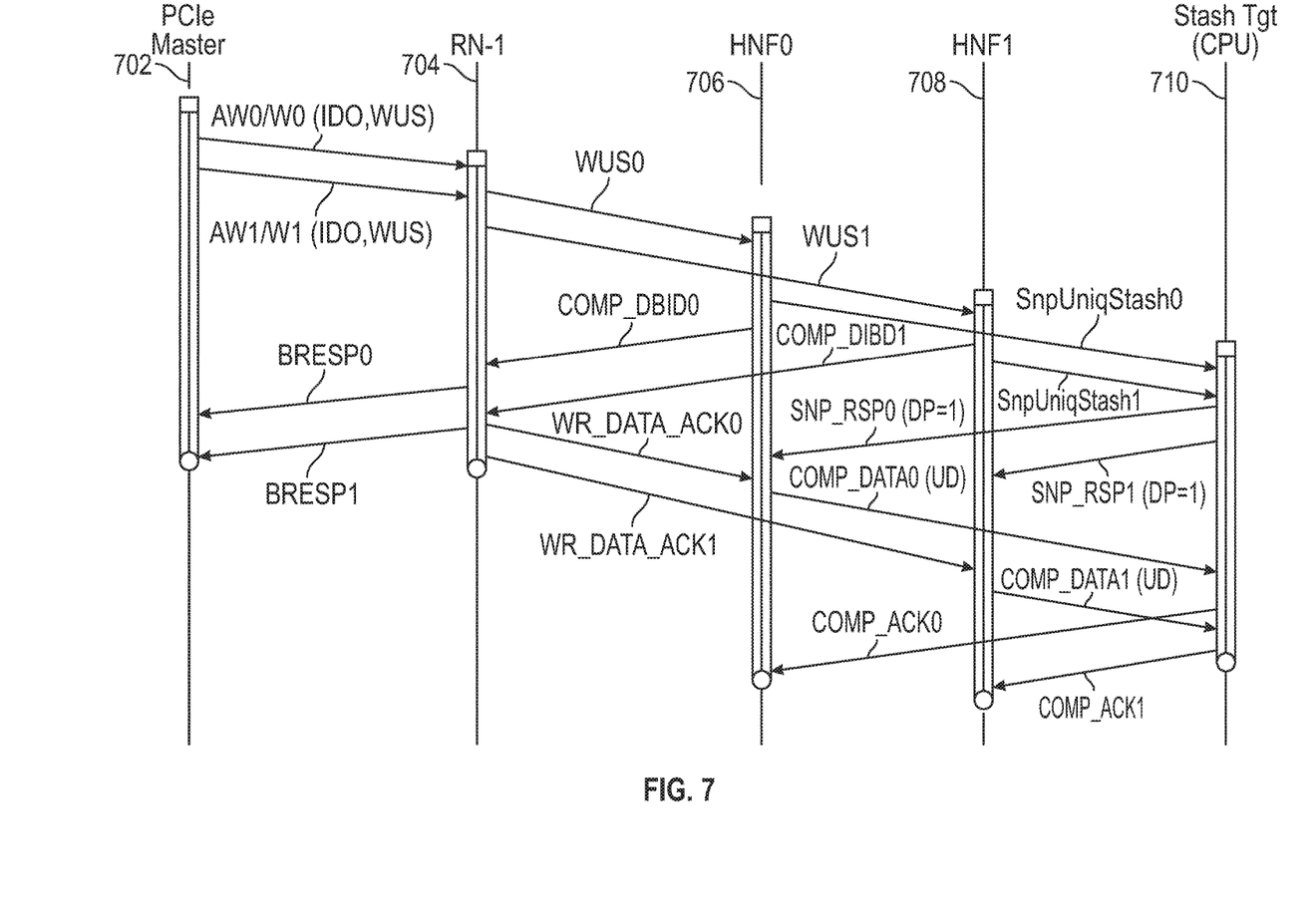

FIG. 7 is a further transaction flow diagram for a data processing system, in accordance with embodiments of the disclosure. The following timelines are shown: 702 for a source device (PCIe master in the example shown), 704 for an I/O request node (RN-1), 706 for a first home node (HNF0), 708 for a second home node (HNF1) and 710 for the stash target or target device. FIG. 7 illustrates transaction flows for multiple ordered stash transactions from the PCIe master to the Stash target for implementation in the AXI/CHI architecture. Two WR_UNIQ_STASH (WUS) transactions from the PCIe master use the same write address group identifier (AWID) on an AXI channel to denote strong ordering requirements. It is noted that the two writes are striped across multiple HN-F's in the system. Also, the requesting node (RN-I) uses streaming ordered flow to order transaction across HN-F's, and the home node (HN-F) stashes the data into CPU cache only after arrival of COMP_ACK (WR_DATA_ACK). Thus, the ordered write observation property can be maintained for write stashes. As shown in FIG. 7, write stashes from RN-I can be completely pipelined in the system, resulting in very high-performance levels for writes.

In the embodiment shown in FIG. 7, the source device is a PCIe master, but ordered data may be received from other devices such as graphics processor, serial ports, accelerators etc. In the example shown, the source device sends two write requests in messages AW0/W0(ID0,WUS) and AW1/W1 (ID0,WUS). These requests have the same stream identifier (ID0), indicating that order should be maintained. The request also contains the designator WUS (write unique stash) indicating that the data is to be stashed at a target node rather than sent to memory. Upon receiving the requests, the RN-I sends two write requests (WUS0 and WUS1) to Home Nodes (HNs) of the data processing network. In the example shown, these requests are sent to different HNs, but the requests may be sent to the same node in other instances. As described above, each request includes an indicator of the target device, a request order (RO) message indicating to the HN that the RN-I will send multiple write requests without any dependency, and an expect completion acknowledgement (ExpCompAck) message indicating to the HN that observation order is to be controlled by the release of a completion acknowledgement (COMP_ACK) message from the RN-I. For each first write request, the receiving HN sends a data buffer identifier (DBID_RSP) message, identifying a data buffer for receiving data associated with the first write request, and a completion (COMP) message indicating completion by the HN. In the example shown, these messages are combined as DBID_COMP0 and DBID_COMP1 sent from home nodes HNF0 and HNF1, respectively.

The RN-I sends the data to be written to the HN in response to the DBID-RSP message and sends a first completion acknowledgement (COMP_ACK) message in response to the COMP message. These responses are combined as WR_DATA_ACK0 and WR_DATA_ACK1. In accordance with an aspect of the present disclosure, the first COMP_ACK messages are not sent by the RN-I until COMP messages for all older write requests of the data stream have been received by the RN-I.

Responsive to each first COMP_ACK message, an HN sends the data to be written to the target device. In particular, HNF0 sends data to the target device in message COMP_DATA0(UD) after WR_DATA_ACK0 has been received from the RN-I, and HNF1 sends data to the target device in message COMP_DATA1(UD) after WR_DATA_ACK1 has been received from the RN-I. In response to receiving the data, the target device sends a second COMP_ACK message to the corresponding FIN (COMP_ACK0 to HNF0 and COMP_ACK1 to HNF1).

When the RN-I receives a COMP_DBID message from an HN, it sends a confirmation message, BRESP0 or BRESP1, back to the source device (the PCIe master in the example shown).

Each HN sends a snoop message (snpUniqStash0 or snpUniqStash1) to the target device in accordance with a coherence protocol in response to each write request received and receives a snoop response (SNP_RSP0 or SNP_RSP1) from the target device. The data to be written is not sent from the HN to the target device until the response to the snoop message is received by the HN. As before, the RN-I may detect deadlock in the interconnect and send a WR CANCEL message to end the deadlock.

Table 1 below shows test results for the mechanism disclosed above. In the tests, write stashes for the same write address group (e.g. same AWID) were injected at one requesting node (RN-I) or multiple (three) requesting nodes. The writes were striped across multiple (four) home nodes, and the stash target was distributed across three CPUs, single CPU, or no CPU. The measurements were performed for a 32B RN-I DATA Interface running at 2 GHz. The table shows bandwidth comparisons of a current flow mechanism with the disclosed flow mechanism.

TABLE 1

Bandwidth Comparisons.

| | | Current flow | | New flow | |
|---|---|---|---|---|---|
| # | Test: Ordered WrUniqStash | RN-I Wr BW (GBps) | RN-F Rd BW (GBps) | RN-I Wr BW (GBps) | RN-F Rd BW (GBps) |
| 1 | one RN-I to 3 RN-Fs | 3.5 | 3.5 | 62.46 | 60.86 |
| 2 | one RN-I to single RN-F | 3.5 | 3.5 | 57.40 | 43.32 |
| 3 | one RN-I to invalid StashTgt (stashing to HN-F) | 5.4 | n/a | 63.56 | n/a |
| 4 | 3 RN-Is to 3 RN-Fs | 10.5 | 3.5 | 75.06 | 74.36 |
| 5 | 3 RN-Is to invalid StashTgt (stashing to HN-F) | 16 | n/a | 74.96 | n/a |

Those skilled in the art will recognize that the present invention has been described in terms of exemplary embodiments. The present invention could be implemented using hardware component equivalents such as special purpose hardware and/or dedicated processors which are equivalents to the embodiments as described and claimed. Similarly, general purpose computers, microprocessor-based computers, micro-controllers, optical computers, analog computers, dedicated processors and/or dedicated hard wired logic may be used to construct alternative equivalent embodiments of the present invention.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present invention. For example, the order of certain operations carried out can often be varied, additional operations can be added or operations can be deleted without departing from the disclosure. Such variations are contemplated and considered equivalent.

Accordingly, some aspects and features of the disclosed embodiments are set out in the following numbered items:

1. A method for transferring ordered data from a source device to a target device in a data processing network, where the source device is coupled to a Request Node of the data processing network, the method comprising: receiving, by the Request Node, a first write request from the source device, where the first write request is targeted to the target device and is associated with a stream identifier; sending, by the Request Node to a Home Node of the data processing network, a second write request; sending, by the Home Node to the Request Node responsive to the second write request, a write data buffer credit message, identifying a data buffer for receiving the data to be written, and a completion message indicating completion by the Home Node; sending, by the Request Node to the Home Node responsive to the write data buffer credit message, the data to be written; sending, by the Request Node to the Home Node responsive to the completion message, a first completion acknowledgement message; sending, by the Home Node to the target device responsive to the first completion acknowledgement message, the data to be written; and sending, by the target device to the Home Node responsive to receiving the data to be written, a second completion acknowledgement message, where the first completion acknowledgement message is not sent by the Request Node until completion messages for all write requests older than the first write request and having the same stream identifier as the first write request have been received by the Request Node.

2. The method of item 1, where the second write request indicates to the Home Node that the data to be written is part of a set of ordered data and that the observation order is to be controlled by the release of a completion acknowledgement message from the Request Node.

3. The method of item 1, where the write data buffer credit message and the completion message sent from the Home Node to the Request Node are combined as one message when the Home Node determines that no target nodes have older copies of the data to be written.

4. The method of item 1, where the completion acknowledgement message and the data to be written sent from the Request Node to the Home Node are combined as one message when the Request Node determines that all the older writes have received completion messages from the Home Node.

5. The method of item 1, further comprising: sending, by the Home Node to the target device, a snoop message in accordance with a coherence protocol; and sending, by the target device to the Home Node, a response to the snoop message; where the data to be written is not sent from the Home Node to the target device until the response to the snoop message is received by the Home Node.

6. The method of item 1, where the first write request comprises a stash request and where the data to be written is stored in a unique-dirty coherence state at the target device.

7. The method of item 1, further comprising: detecting, by the Request Node, deadlock resulting from resource conflict in an interconnect of the data processing network; sending, by the Request Node to the Home Node, a message to cancel the first write request; sending, by the Home Node responsive to the message to cancel the first write request, a snoop request to a memory controller to retrieve a latest copy of the data associated with an address of the data to be written; and receiving, by the Home Node from the memory controller, the latest copy of the data associated with the address of the data to be written; where the latest copy of the data associated with an address of the data to be written is sent to the target device instead of the data to be written.

8. The method of item 1, where the source device comprises an input/output device, an accelerator device, or a graphics processing unit.

9. The method of item 1, further comprising the Home Node freeing the data buffer responsive to the second completion acknowledgement message.

10. A method for transferring ordered data of a data stream from a Request Node to a Target Node in a data processing network, the method comprising: sending, by the Request Node to one or more Home Nodes of the data processing network, a plurality of first write requests; for each first write request of the plurality of write requests: sending, by a Home Node of the one or more Home Nodes to which the first write request was sent, a write data buffer credit message, identifying a data buffer for receiving data associated with the first write request, and a completion message indicating completion by the Home Node; sending, by the Request Node to the Home Node responsive to the write data buffer credit message, the data to be written; sending, by the Request Node to the Home Node responsive to the completion message, a first completion acknowledgement message; sending, by the Home Node to the target device responsive to the first completion acknowledgement message, the data to be written; and sending, by the target device to the Home Node responsive to receiving the data to be written, a second completion acknowledgement message, where the first completion acknowledgement message is not sent by the Request Node until completion messages for all older write requests of the data stream have been received by the Request Node.

11. The method of item 10, where the write data buffer credit message and the completion message sent from the Home Node to the Request Node are combined as one message for each first write request.

12. The method of item 10, where the completion acknowledgement message and the data to be written sent from the Request Node to the Home Node are combined as one message for each first write request.

13. The method of item 10, further comprising: sending, by the Home Node of the one or more Home Nodes to which the first write request was sent, a snoop message to the target device in accordance with a coherence protocol; and sending, by the target device to the Home Node, a response to the snoop message; where data associated with the first write request is not sent from the Home Node to the target device until the response to the snoop message is received by the Home Node.

14. The method of item 10, where the plurality of first write requests comprise stash requests and where the data associated with the first request is stored in a unique-dirty (UD) coherence state at the target device.

15. The method of item 10, further comprising: detecting, by the Request Node, deadlock resulting from resource conflict in an interconnect of the data processing network; sending, by the Request Node to a Home Node of the one or more Home Nodes, a message to cancel a first write request of the plurality of write requests; sending, by the Home Node responsive to the message to cancel the first write request, a snoop request to a memory controller to retrieve a latest copy of the data associated with an address of data to be written; and receiving, by the Home Node from the memory controller, the latest copy of the data associated with the address of the data of the cancelled first write request; where the latest copy of the data of the cancelled first write request is sent to the target device instead of the data associated with the first write request.

16. The method of item 10, where the ordered data of the data stream is received at the Request Node from an input/output device, an accelerator device, or a graphics processing unit.

17. A data processing network comprising: a target node; a Request Node configured for receiving a first write request from a source device for data to be written to the target node, the data associated with an ordered data stream and the first write request associated with the data stream identifier; a Home Node that provides a point of coherency for the data processing network, where the Home Node is coupled to the target node and the Request Node via an interconnect; where the Request Node is configured for: sending a second write request to the Home Node responsive to the first write request from the source device; receiving, from the Home Node responsive to the second write request, a write data buffer credit message, identifying a data buffer for receiving the data to be written, and a completion (message indicating completion by the Home Node; sending, to the Home Node responsive to the write data buffer credit message, the data to be written; and sending, to the Home Node responsive to the completion message, a first completion acknowledgement message, where the first completion acknowledgement message is not sent until completion messages for all write requests that are older than the first write request and are associated with the same data stream identifier as the first write request have been received by the Request Node; where the Home Node is configured for sending the data to be written to the target device responsive to the first completion acknowledgement message; and where the target device is configured for sending a second completion acknowledgement message to the Home Node responsive to receiving the data to be written.

18. The data processing network of item 17, where the write data buffer credit message and the completion message sent from the Home Node to the Request Node are combined as one message.

19. The data processing network of item 17, where the completion acknowledgement message and the data to be written sent from the Request Node to the Home Node are combined as one message.

20. The data processing network of item 17, where: the Home Node is configured for sending a snoop message to the target node in accordance with a coherence protocol; the target node is configured for sending a response to the snoop message back to the Home Node; and the data to be written is not sent from the Home Node to the target device until the response to the snoop message is received by the Home Node.

21. The data processing network of item 17, where the second write request comprises a stash request and where the data to be written is stored in a unique-dirty coherence state in a cache of the target node.

22. The data processing network of item 17, where: the Request Node is further configured for detecting deadlock resulting from resource conflict in an interconnect of the data processing network and sending a message to cancel the first write request to the Home Node; and the Home Node is further configured, responsive to the message to cancel the first write request, for: sending a snoop request to a memory controller of the data processing network to retrieve a latest copy of the data associated with an address of the data to be written; receiving, from the memory controller, the latest copy of the data associated with the address of the data to be written; and sending the latest copy of the data associated with an address of the data to be written to the target device instead of the data to be written.

23. The data processing network of item 17, where the source device comprises an input/output device, an accelerator device, or a graphics processing unit.

24. The data processing network of item 17, formed on a single chip.

25. A non-transitory computer readable medium comprising instructions of a Hardware Description Language descriptive of the data processing network of item 17.

26. A non-transitory computer readable medium storing a netlist of components and connectivity of the data processing network of item 17.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the present invention.

We claim:

1. A method for transferring ordered data from a source device to a target device in a data processing network, where the source device is coupled to a Request Node of the data processing network, the method comprising:
   receiving, by the Request Node, a first write request from the source device, where the first write request is targeted to the target device and is associated with a stream identifier;
   sending, by the Request Node to a Home Node of the data processing network, a second write request;
   sending, by the Home Node to the Request Node responsive to the second write request, a write data buffer credit message, identifying a data buffer for receiving data to be written, and a completion message indicating completion by the Home Node;
   sending, by the Request Node to the Home Node responsive to the write data buffer credit message, the data to be written;
   sending, by the Request Node to the Home Node responsive to the completion message, a first completion acknowledgement message;
   sending, by the Home Node to the target device responsive to the first completion acknowledgement message, the data to be written; and
   sending, by the target device to the Home Node responsive to receiving the data to be written, a second completion acknowledgement message;
   where the first completion acknowledgement message is not sent by the Request Node until completion messages for all write requests older than the first write request and having the same stream identifier as the first write request have been received by the Request Node.

2. The method of claim 1, where the second write request indicates to the Home Node that the data to be written is part of a set of ordered data and that observation order is to be controlled by release of a completion acknowledgement message from the Request Node.

3. The method of claim 1, where the write data buffer credit message and the completion message sent from the Home Node to the Request Node are combined as one message when the Home Node determines that no target devices have older copies of the data to be written.

4. The method of claim 1, where the first completion acknowledgement message and the data to be written sent from the Request Node to the Home Node are combined as one message when the Request Node determines that all older writes have received completion messages from the Home Node.

5. The method of claim 1, further comprising:
sending, by the Home Node to the target device, a snoop message in accordance with a coherence protocol; and
sending, by the target device to the Home Node, a response to the snoop message;
where the data to be written is not sent from the Home Node to the target device until the response to the snoop message is received by the Home Node.

6. The method of claim 1, where the first write request comprises a stash request and where the data to be written is stored in a unique-dirty coherence state at the target device.

7. The method of claim 1, further comprising:
detecting, by the Request Node, deadlock resulting from resource conflict in an interconnect of the data processing network;
sending, by the Request Node to the Home Node, a message to cancel the first write request;
sending, by the Home Node responsive to the message to cancel the first write request, a snoop request to a memory controller to retrieve a latest copy of the data associated with an address of the data to be written; and
receiving, by the Home Node from the memory controller, the latest copy of the data associated with the address of the data to be written;
where the latest copy of the data associated with an address of the data to be written is sent to the target device instead of the data to be written.

8. The method of claim 1, where the source device comprises an input/output device, an accelerator device, or a graphics processing unit.

9. The method of claim 1, further comprising the Home Node freeing the data buffer responsive to the second completion acknowledgement message.

10. A method for transferring ordered data of a data stream from a Request Node to a target device in a data processing network, the method comprising:
sending, by the Request Node to one or more Home Nodes of the data processing network, a plurality of first write requests;
for each first write request of the plurality of first write requests:
sending, by a Home Node of the one or more Home Nodes to which the first write request was sent, a write data buffer credit message, identifying a data buffer for receiving data associated with the first write request, and a completion message indicating completion by the Home Node;
sending, by the Request Node to the Home Node responsive to the write data buffer credit message, data to be written;
sending, by the Request Node to the Home Node responsive to the completion message, a first completion acknowledgement message;
sending, by the Home Node to the target device responsive to the first completion acknowledgement message, the data to be written; and
sending, by the target device to the Home Node responsive to receiving the data to be written, a second completion acknowledgement message;
where the first completion acknowledgement message is not sent by the Request Node until completion messages for all older write requests of the data stream have been received by the Request Node.

11. The method of claim 10, where the write data buffer credit message and the completion message sent from the Home Node to the Request Node are combined as one message for each first write request.

12. The method of claim 10, where the first completion acknowledgement message and the data to be written sent from the Request Node to the Home Node are combined as one message for each first write request.

13. The method of claim 10, further comprising:
sending, by the Home Node of the one or more Home Nodes to which the first write request was sent, a snoop message to the target device in accordance with a coherence protocol; and
sending, by the target device to the Home Node, a response to the snoop message;
where data associated with the first write request is not sent from the Home Node to the target device until the response to the snoop message is received by the Home Node.

14. The method of claim 10, where the plurality of first write requests comprise stash requests and where the data associated with the first write requests is stored in a unique-dirty coherence state at the target device.

15. The method of claim 10, further comprising:
detecting, by the Request Node, deadlock resulting from resource conflict in an interconnect of the data processing network;
sending, by the Request Node to a Home Node of the one or more Home Nodes, a message to cancel a first write request of the plurality of first write requests;
sending, by the Home Node responsive to the message to cancel the first write request, a snoop request to a memory controller to retrieve a latest copy of the data associated with an address of the data to be written; and
receiving, by the Home Node from the memory controller, the latest copy of the data associated with the address of the data of the cancelled first write request;
where the latest copy of the data of the cancelled first write request is sent to the target device instead of the data associated with the first write request.

16. The method of claim 10, where the ordered data of the data stream is received at the Request Node from an input/output device, an accelerator device, or a graphics processing unit.

17. A data processing network comprising:
Target Node;
a Request Node configured for receiving a first write request from a source device for data to be written to the Target Node, the data associated with an ordered data stream and the first write request associated with a data stream identifier;
a Home Node that provides a point of coherency for the data processing network, where the Home Node is coupled to the Target Node and the Request Node via an interconnect;
where the Request Node is configured for:
sending a second write request to the Home Node responsive to the first write request from the source device;
receiving, from the Home Node responsive to the second write request, a write data buffer credit message, identifying a data buffer for receiving the data to be written, and a completion message;

sending, to the Home Node responsive to the write data buffer credit message, the data to be written; and sending, to the Home Node responsive to the completion message, a first completion acknowledgement message, where the first completion acknowledgement message is not sent until completion messages for all write requests that are older than the first write request and are associated with the same data stream identifier as the first write request have been received by the Request Node;

where the Home Node is configured for sending the data to be written to the Target Node responsive to the first completion acknowledgement message; and where the Target Node is configured for sending a second completion acknowledgement message to the Home Node responsive to receiving the data to be written.

18. The data processing network of claim 17, where the write data buffer credit message and the completion message sent from the Home Node to the Request Node are combined as one message.

19. The data processing network of claim 17, where the first completion acknowledgement message and the data to be written sent from the Request Node to the Home Node are combined as one message.

20. The data processing network of claim 17, where:
the Home Node is configured for sending a snoop message to the Target Node in accordance with a coherence protocol;
the Target Node is configured for sending a response to the snoop message back to the Home Node; and
the data to be written is not sent from the Home Node to the Target Node until the response to the snoop message is received by the Home Node.

21. The data processing network of claim 17, where the second write request comprises a stash request and where the data to be written is stored in a unique-dirty coherence state in a cache of the Target Node.

22. The data processing network of claim 17, where:
the Request Node is further configured for detecting deadlock resulting from resource conflict in an interconnect of the data processing network and sending a message to cancel the first write request to the Home Node; and
the Home Node is further configured, responsive to the message to cancel the first write request, for:
sending a snoop request to a memory controller of the data processing network to retrieve a latest copy of the data associated with an address of the data to be written;
receiving, from the memory controller, the latest copy of the data associated with the address of the data to be written; and
sending the latest copy of the data associated with an address of the data to be written to the Target Node instead of the data to be written.

23. The data processing network of claim 17, where the source device comprises an input/output device, an accelerator device, or a graphics processing unit.

24. A non-transitory computer readable medium comprising instructions of a Hardware Description Language descriptive of the data processing network of claim 17.

25. A non-transitory computer readable medium storing a netlist of components and connectivity of the data processing network of claim 17.

* * * * *